United States Patent
Koyama et al.

(10) Patent No.: US 12,372,970 B2
(45) Date of Patent: Jul. 29, 2025

(54) ROBOT STOP POSITION SETTING DEVICE AND MOBILE ROBOT SYSTEM

(71) Applicant: Hitachi High-Tech Corporation, Tokyo (JP)

(72) Inventors: Ryo Koyama, Tokyo (JP); Nobutaka Kimura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 39 days.

(21) Appl. No.: 18/172,659

(22) Filed: Feb. 22, 2023

(65) Prior Publication Data

US 2023/0280761 A1 Sep. 7, 2023

(30) Foreign Application Priority Data

Mar. 7, 2022 (JP) ................. 2022-034197
Mar. 29, 2022 (JP) ................. 2022-053444

(51) Int. Cl.
G05D 1/00 (2024.01)
B25J 5/00 (2006.01)

(52) U.S. Cl.
CPC ............. *G05D 1/0274* (2013.01); *B25J 5/00* (2013.01)

(58) Field of Classification Search
CPC ........ B25J 5/00; G05D 1/0274; G05D 1/0221
See application file for complete search history.

(56) References Cited

U.S. PATENT DOCUMENTS

| | | | |
|---|---|---|---|
| 8,229,595 B2* | 7/2012 | Seelinger | G05D 1/0251 700/250 |
| 10,747,229 B2 | 8/2020 | Matsuno et al. | |
| 11,833,697 B2* | 12/2023 | Clever | B25J 9/1605 |
| 2019/0291275 A1 | 9/2019 | Szarski et al. | |
| 2020/0159222 A1* | 5/2020 | Mao | G06T 7/593 |
| 2020/0238530 A1* | 7/2020 | Kumagai | B25J 19/04 |
| 2021/0101293 A1* | 4/2021 | Kobayashi | B25J 5/007 |
| 2022/0003569 A1 | 1/2022 | Maeda | |
| 2022/0276659 A1 | 9/2022 | Mizui et al. | |
| 2023/0244235 A1* | 8/2023 | Okada | G05D 1/0274 701/26 |

FOREIGN PATENT DOCUMENTS

| | | |
|---|---|---|
| DE | 11 2019 007 750 T5 | 6/2022 |
| EP | 3 048 417 B1 | 3/2021 |
| JP | 2006-113858 A | 4/2006 |

(Continued)

OTHER PUBLICATIONS

German-language Office Action issued in German Application No. 10 2023 201 820.9 dated May 21, 2024 with English translation (10 pages).

(Continued)

*Primary Examiner* — Khoi H Tran
*Assistant Examiner* — Nhi Q Bui
(74) *Attorney, Agent, or Firm* — Crowell & Moring LLP

(57) ABSTRACT

Provided is a robot stop position setting device that sets a stop position of a robot, including a map storage unit for storing map information, a stop position storage unit for storing a robot stop position, a reference position output unit that outputs a reference position for calculating the robot stop position, and a stop position calculation unit that calculates the robot stop position based on the reference position.

11 Claims, 16 Drawing Sheets

(56) References Cited

FOREIGN PATENT DOCUMENTS

| | | | |
|---|---|---|---|
| JP | 2009-169845 A | | 7/2009 |
| JP | 2010-264553 A | | 11/2010 |
| JP | 2013-114500 A | | 6/2013 |
| JP | 2014-71847 A | | 4/2014 |
| JP | 2014-203145 A | | 10/2014 |
| JP | 2019-166631 A | | 10/2019 |
| JP | 2020-87248 A | | 6/2020 |
| JP | 2021099682 A | * | 7/2021 |
| JP | 2021122868 A | * | 8/2021 |
| JP | 2021-140583 A | | 9/2021 |

OTHER PUBLICATIONS

Japanese-language Office Action issued in Japanese Application No. 2022-053444 dated Feb. 4, 2025, with English translation (8 pages).

* cited by examiner

ROBOT STOP POSITION SETTING DEVICE AND MOBILE ROBOT SYSTEM

CLAIM OF PRIORITY

The present application claims priority from Japanese patent application serial no. 2022-034197 filed on Mar. 7, 2022, which further claims priority from Japanese patent application serial no. 2022-053444 filed on Mar. 29, 2022, the contents of which are hereby incorporated by reference into this application.

BACKGROUND OF THE INVENTION

1. Field of the Invention

The present invention relates to a robot stop position setting device and a mobile robot system.

2. Description of Related Art

In recent years, a mobile robot system, which travels in a work site without using a guide such as magnetic tape, is being used for a purpose of labor saving and automation of various site works. Such a robot system generally stores map information of traveling environment in a non-volatile storage device in order to estimate a position of a traveling robot based on sensor information, and to define a stop position and driving route of the robot.

In such a robot system, when there is a large discrepancy between map information stored in the system and an actual traveling environment, the robot may behave inappropriately, so various countermeasures have been taken in the related art.

As a first example, when an environment shape changes due to changes in placement of an object in a traveling environment, the robot cannot correctly estimate its own position, and may not be able to travel according to a preset stop position or travel route. On the other hand, a method has been proposed in which a robot travels according to a stop position and a travel route that are set before environmental change by updating map information according to a changed environmental shape to make it possible to continue self-position estimation, or changing the stop position and traveling route stored in a mobile robot system.

As such a method, JP2013-114500A discloses "a service control system for controlling a service provided by a real-world interface system that includes a first observation unit that observes surrounding physical environment, an operation unit that performs physical operation or information processing based on an observation result of the first observation unit, definition data defining operation of the operation unit, and an operation instruction unit that controls the operation of the operation unit according to the definition data, including a second observation unit that observes an observation target different from that of the first observation unit, or observes the same observation target by different means, and an update unit that updates the definition data based on a difference between the operation unit operating based on the observation result of the first observation unit and the operation unit operating based on an observation result of the second observation unit.

As a second example, as a result of a change in placement of an object in a traveling environment and an obstacle placed on a preset traveling path of a robot, the robot may collide with the obstacle or may not be able to reach an intended stop position. To deal with this, there is a technology that updates map information and then re-plans the stop position and route so as not to interfere with the obstacle.

As such a technique, JP2020-087248A discloses a configuration in which "a map creation unit that creates an external world map based on external world information and an action plan unit that generates an action plan for a robot device based on the external world map are provided, and the map creation unit creates the external world map based on a map specification created by the action plan unit.

In this way, in the related art described above, for a purpose of a robot traveling as set in advance or modifying a setting so as not to interfere with an obstacle even when traveling environment changes, map information, a stop position, and a route are automatically updated. However, automatic updating of the data stored in the mobile robot system may lead to unintended consequences for a user, so there is also a configuration in which operation by the user is used as an auxiliary. For example, there is a configuration that uses map information in which a user sets "an area where updating is permitted and an area where updating is not permitted" (see JP2014-203145A), and a configuration that has an "acceptance/rejection instruction input unit for inputting an acceptance or rejection instruction of the updated part by an operator" (see JP2009-169845A).

Thus, according to the related art, even when the traveling environment changes within the same site, it is possible to estimate its own position and travel and stop as predetermined without being affected by an environmental change, and it is also possible to change a route and a stop position so as not to collide with an obstacle.

However, the related art has the following two problems.

First, for example, when a movable robot having a manipulator stops in front of a workbench and works with an article placed on the workbench, the robot must stop at a position where it can operate the article on the workbench, and when a position of the workbench in a site is changed, the stop position of the robot must also be changed appropriately according to the workbench. However, in the related art, only avoidance of interference between a surrounding obstacle and the robot is taken into consideration when updating the stop position. Therefore, a relative positional relationship between the workbench and the stop position of the robot is changed, and the robot cannot perform the work. In other words, a first problem of the related art is that when the robot stops on the basis of a specific object in order to perform a task, when a position of the object is changed within the same site, it is not possible to appropriately change the stop position accordingly.

Also, for example, when relocating a robot system including a process in which a movable robot that transports a load stops in front of a robot arm that picks up the load from a site with a development environment to another site with an operation environment, since placement of equipment including the robot arm in the environment is different before and after the relocation, it is not possible to apply a stop position and route information set in the development environment as it is in the operation environment. Although it is necessary to appropriately change the stop position and route according to arrangement of the equipment in the operation environment, a method for efficiently implementing such a change is not disclosed. In other words, a second problem of the related art is that when the robot stops on the basis of a specific object in order to perform a task, when the site where the mobile robot system is used is changed, the stop position and route information set on the site before the change cannot be appropriately changed according to the site after the change, and cannot be reused.

Due to the above-described two problems, when a position of an object (hereinafter, referred to as a stop reference object) that serves as a reference for a stop position is changed, or when the entire system including the stop reference object is relocated to another site, it was necessary to reconfigure the stop position according to the stop reference object in the same way as setting work that was performed in advance before the change. When setting the stop position of a robot for the stop reference object, the user will perform a following task. First, an actual robot is manually operated and moved to a vicinity of the stop reference object. Next, a positional relationship between the robot and the stop reference object is measured with a tape measure or other units for measuring. When the robot does not stop at an appropriate position, the robot is manually operated again and fine-adjustment of the position of the robot is performed. Then, after repeating measurement and fine-adjustment of the robot stop position until the robot is in an appropriate position, a current position on a map is calculated by a self-position estimation function of the robot, and these coordinates are set as a new stop position. The above-described work requires time to repeat the measurement and the fine-adjustment of the stop position. In addition, when measuring the position with a tape measure or ruler, a setting worker has to work while crouching near the robot, which places a physical burden on the setting worker.

In the background of these problems becoming apparent, a usage scene of the mobile robot system has expanded from factories with fixed site layouts to medical sites and distribution warehouses where layout changes are frequent, and there is a growing need to quickly and easily set up a robot system at a site of use. In the future, it will become more and more important to shorten the work time required for setting a stop position and reduce the work load.

SUMMARY OF THE INVENTION

The invention is made in view of such problems, and an object of the invention is to provide a robot stop position setting device that can be performed in a short time without need for actual machine operation or measurement work to set a stop position after an environmental change by utilizing a result of stop position setting performed before the environmental change.

To solve the problem described above, a robot stop position setting device of the invention includes a map storage unit for storing map information, a stop position storage unit for storing a robot stop position, a reference position output unit that outputs a reference position for calculating the robot stop position, and a stop position calculation unit that calculates the robot stop position based on the reference position.

With the robot stop position setting device of the invention, when the work of setting the robot stop position based on the stop reference object as a reference is performed only once, even when the position of the stop reference object is changed or the mobile robot system is relocated to another site and the environment map is updated, there is no need to operate an actual machine to reset the stop position. As a result, it is possible to reduce the time required to set the robot stop position.

DESCRIPTION OF EMBODIMENTS

Hereinafter, examples of the invention will be described with reference to the drawings. The examples are merely illustrations for explaining the invention, and do not limit the invention, and are appropriately omitted and simplified for the sake of clarity of explanation. The invention can also be implemented in various other examples and examples in which some or all of the examples are combined. Unless otherwise specified, each component may be singular or plural. In addition, in the description of the examples described later, the description will focus on differences from the previously described examples, and the description of overlapping parts will be omitted as appropriate.

First Example

First, a mobile robot system 1 of a first example will be described with reference to FIGS. 1 to 7.

Figure 1:
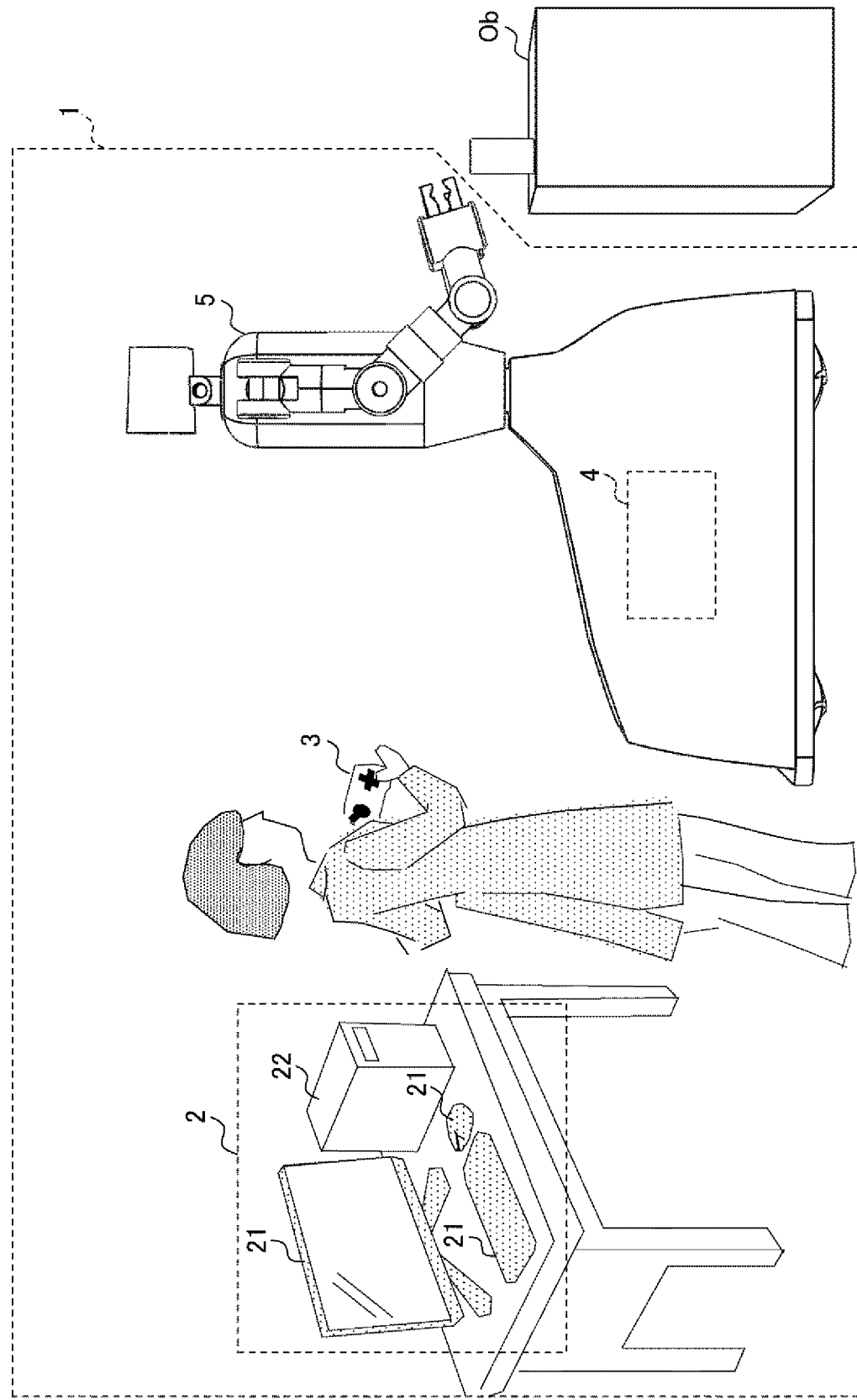
FIG. 1 is a view illustrating a configuration example of a mobile robot system of a first example.

FIG. 1 illustrates a configuration example of a mobile robot system according to the first example. As shown here, the mobile robot system 1 of this example includes a setting device 2, a controller 3, a control device 4, and a robot 5, and the mobile robot system 1 controls movement of the robot 5 so that it stops at a predetermined robot stop position P based on a stop reference object Ob. Although not illustrated, the setting device 2, the controller 3, the control device 4, and the robot 5 are connected wirelessly or the like so as to be able to communicate with each other.

The stop reference object Ob is, for example, a workbench on which an object to be operated by the robot 5 is placed. The stop reference object Ob may be a device to be operated by the robot 5. The stop reference object Ob may be a conveyor on which a load conveyed by the robot 5 is placed. The stop reference object Ob may be a movable object such as a trolley, a device with casters, or a movable conveyor, but it must be placed at a predetermined position in the environment when creating an environment map, which will be described below.

A user confirms a status of the mobile robot system 1 using the setting device 2. Here, the status includes, for example, a remaining battery level of the robot 5, an error message generated by an element forming the mobile robot system 1, a mode of the mobile robot system, current settings, and the like.

In addition, the user performs various settings via the setting device 2 so that the mobile robot system 1 operates in accordance with the user's intention. Here, the settings include, for example, a stop position of the robot 5, a travel route, map information to be used, and contents of a task that the robot 5 performs at each stop position.

The setting device 2 is a personal computer, for example, and has a user interface 21 and an arithmetic device 22. Although FIG. 1 illustrates the user interface 21 formed of a display, a keyboard, a mouse, and the like, a user interface 21 of a touch panel type display may also be used so that the user can set the mobile robot system with intuitive touch operations. The arithmetic device 22 includes an arithmetic unit such as a central processing unit (CPU), a random access memory (RAM) unit such as a semiconductor memory, a storage unit such as a solid state drive (SSD) or a hard disk drive (HDD), a communication unit, and the like. The arithmetic device 22 may use a processing device such as an application specific integrated circuit (ASIC) or a programmable logic device (PLD) such as a field programmable gate array (FPGA) instead of the CPU, or may be realized as a part of the control device 4. Also, the setting device 2 may be configured by a mobile terminal such as a smart phone or a tablet. In this case, the effect is obtained that the user can set the mobile robot system at any position.

The controller 3 is, for example, a device having either one or both of a joystick and a button. As an example of an operation method, for example, the robot 5 travels in a direction in which the joystick is tilted, and a traveling speed of the robot 5 is adjusted according to an amount of tilting the joystick. The setting device 2 may have some or all of functions of the controller 3. For example, there may be a configuration in which the robot 5 travels in a direction in which a user drags a touch panel, which is the user interface 21 of the setting device 2. Conversely, the controller 3 may have some or all of functions of the setting device 2, and the buttons of the controller 3 may be used to switch a setting item and input a setting value.

The control device 4 is a device that controls the robot 5 while communicating with the setting device 2 and the controller 3. Specifically, the control device 4 is a computer including similar functional units (calculation unit, RAM unit, storage unit, and communication unit) as the arithmetic device 22 described above. Although FIG. 1 illustrates the control device 4 mounted on the robot 5, the control device 4 may be installed outside the robot 5.

Figure 2:
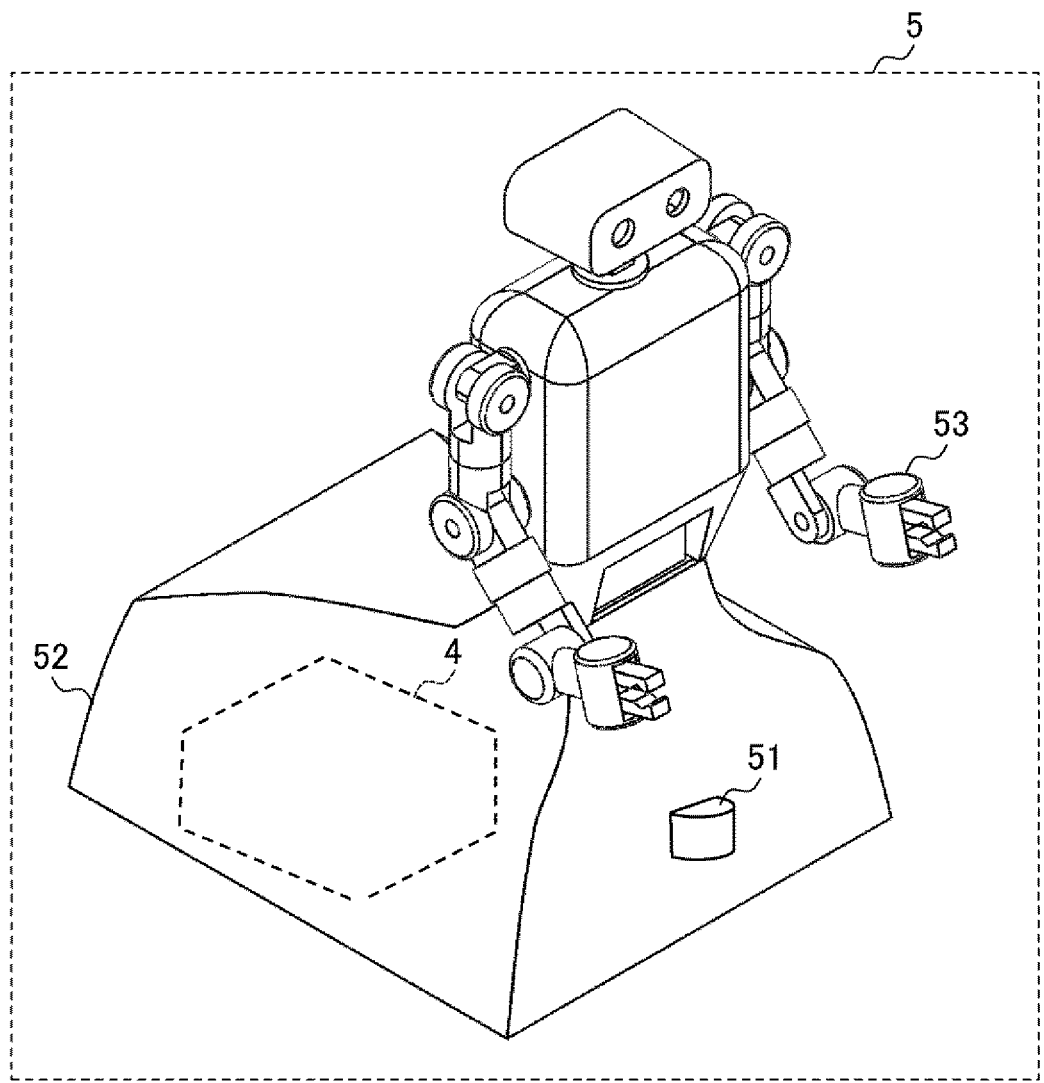
FIG. 2 is a view illustrating a configuration example of a robot of the first example.

The robot 5 has, as illustrated in FIG. 2, a sensor 51 for measuring a surrounding running environment, a moving mechanism 52 for moving, and a manipulator 53.

The sensor 51 is, for example, a distance sensor capable of measuring distances between the sensor 51 and surrounding objects in a plurality of directions. Surrounding objects include the stop reference object Ob. This sensor 51 is an optical sensor, LiDAR, or the like. For example, when an optical sensor is used as the sensor 51, it can detect the environment around the robot 5 by irradiating an obstacle with a laser beam, measuring the distance to the obstacle, and measuring intensity of a reflected light ray.

The moving mechanism 52 is formed of, for example, one or more driving wheels. The moving mechanism 52 may be formed of two drive wheels, and the left and right wheels may be differentially driven. The moving mechanism 52 may be configured using omnidirectional wheels such as mecanum wheels and omni wheels.

The manipulator 53 is capable of performing tasks involving gripping and manipulation (operations such as gripping, pick-and-place, pushing, and pulling) at different positions. The robot 5 with the manipulator 53 makes the whole system less costly than having fixed manipulators in each working position.

Figure 3:
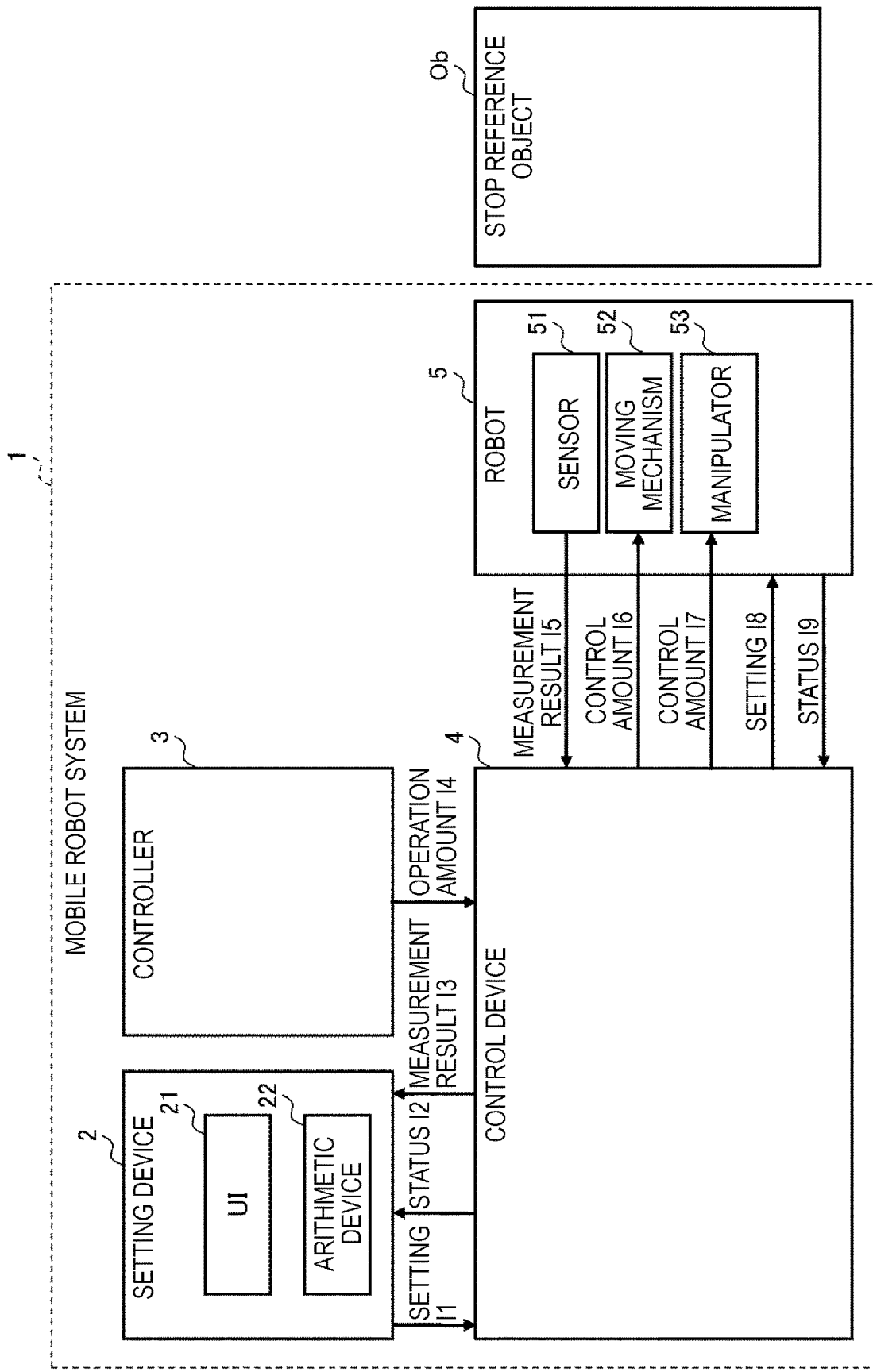
FIG. 3 is a view illustrating information that is exchanged between devices of the mobile robot system of the first example.

FIG. 3 illustrates an example of information exchange between devices forming the mobile robot system 1. First, the setting device 2 outputs a setting I1 input by a user to the control device 4. Next, the controller 3 outputs to the control device 4 an operation amount I4 of the controller 3 by the user. Further, the robot 5 outputs a measurement result I5 of the sensor 51 and a status I9 of the robot 5 to the control device 4. The control device 4 generates a setting I8 using part or all of the setting I1, the operation amount I4, the measurement result I5, and the status I9, and outputs it to the robot 5.

When the robot 5 travels, the control device 4 controls the moving mechanism 52 by outputting a control amount I6 determined using part or all of the setting I1, the operation amount I4, the measurement result I5, and the status I9. Also, when the robot 5 performs manipulation, the control device 4 outputs a control amount I7 determined using part or all of the setting I1, the operation amount I4, the measurement result I5, and the status I9 to the manipulator 53 for control.

The control device 4 uses part or all of the measurement result I5 to generate a measurement result I3 and uses part or all of the status I9 to generate a status I2. The setting device 2 presents part or all of the status I2 and measurement result I3 to the user. The measurement result I3 includes a current position of the robot 5 on a map M.

The setting I1 that the setting device 2 outputs to the control device 4 includes data D1 regarding a mode of the mobile robot system 1, data D2 designating an operation method of the moving mechanism 52 of the robot 5, and data D3 designating the operation method of the manipulator 53 of the robot 5.

The data D1 regarding the mode has, for example, a table type data structure, and character string data indicating a current driving method of the robot 5 is stored in the item "Drive Mode". When manually operating the robot 5, a mode name "MANUAL" is stored in the item "Drive Mode" and the data is transmitted to the control device 4. Then, the control device 4 makes a mode transition to receive the operation amount I4 from the controller 3, and determines the control amount I6 for the robot 5 according to the operation amount I4.

When the robot 5 operates by autopilot, a mode name "AUTO" is stored in the item "Drive Mode" and the data is transmitted to the control device 4. Then, the control device 4 makes a mode transition so as not to receive the operation amount I4 from the controller 3, and automatically travels the robot 5 based on the preset data D2 that designates the operation method of the moving mechanism 52. Also, when the robot 5 reaches the destination set in data D2, the control amount I7 is determined based on the preset data D3, which designates the operation method of the manipulator 53 of the robot 5, and the manipulator 53 is automatically controlled.

The data D2 that designates the operation method of the moving mechanism 52 includes, for example, the map M of the traveling environment of the robot 5, the robot stop position P defined on the map M, and a route L representing a trajectory that the robot 5 passes when moving from its current position to the robot stop position P as a row of positions defined on the map M.

The map M is, for example, a grid map represented by two-dimensional matrix data, and each element of the matrix data stores a probability of existence of an obstacle at that position as a decimal number between 0 and 1. The map M is created by measuring the traveling environment with the sensor 51 or the like mounted on the robot 5, and the grid where an obstacle is observed is set as an obstacle area with a high probability of existence of an obstacle. Also, the grid where no obstacle is observed is set to have a low probability of existence of an obstacle. A value of each element of the matrix data that forms the grid map may be determined by the number of points included in the point group of the obstacles observed by the sensor 51. Alternatively, when the sensor 51 outputs reflection intensity, the value of each element may be determined according to the magnitude of the reflection intensity.

The current position in the above-described measurement result I3, the robot stop position P, and positions in the row or the like of positions that form the path L are, for example, data represented by (x,y,θ), which is a set of coordinates (x,y) [m] in a coordinate system defined in the map M and an angle θ [deg] formed between the front of the robot 5 and an X axis of the map M.

<Setting Procedure for Robot Stop Position P1 Before Environmental Change>

Figure 4:
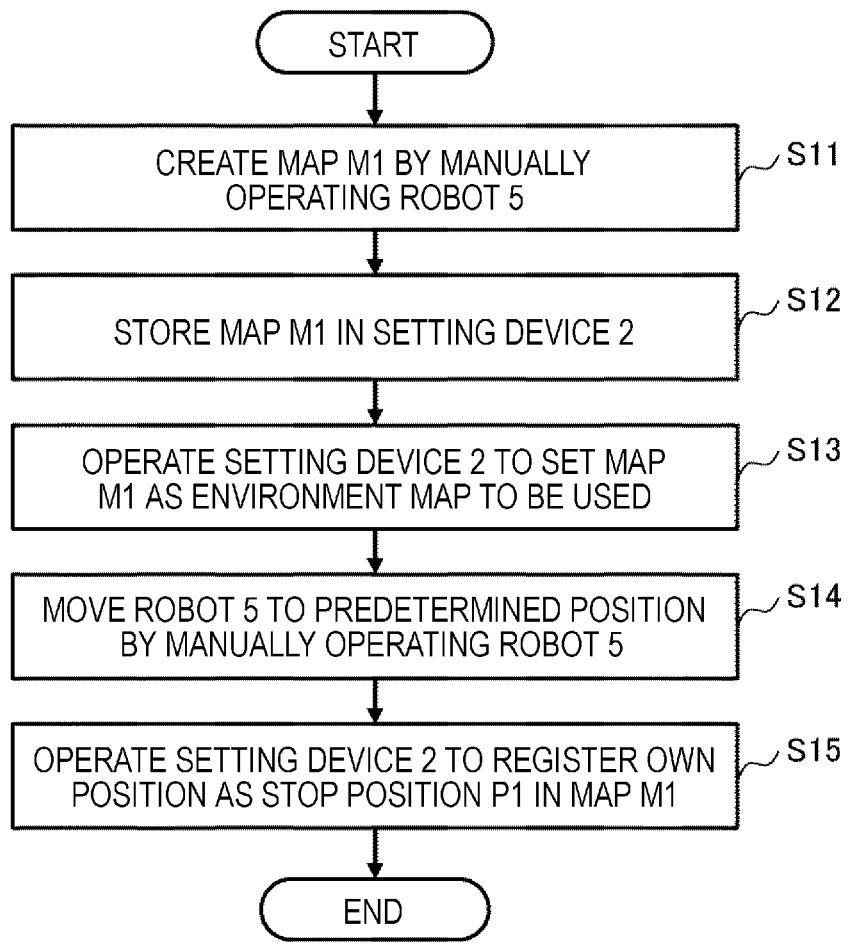
FIG. 4 is a flowchart for setting a robot stop position before environmental change in the first example.

Next, an operation procedure when the user sets a robot stop position P1 before the environmental change will be described with reference to a flowchart of FIG. 4.

First, in step S11, the user manually operates the robot 5 using the controller 3 to create a map M1. The map M1 is a map that is sequentially created by using an output of the sensor 51 when the robot 5 moves through a site before the environmental change. Therefore, it is desirable for the user to create the map M1 of the entire site by manually operating the robot 5 so that the robot 5 moves throughout the site. However, when a movement range of the robot 5 is limited, the map M1 may be created only within a work area of the robot 5. An actual creator of the map M1 may be the control device 4 or the arithmetic device 22.

Next, in step S12, the user stores the created map M1 in a storage unit of the setting device 2.

In step S13, the user sets the stored map M1 as the map for setting the stop position.

Next, in step S14, the user manually operates the robot 5 using the controller 3 to move the robot 5 to the actual position that the user wants to set as the stop position. Then, the user operates the setting device 2 and registers the current position on the map M1 as the robot stop position P1.

<Setting Procedure for Robot Stop Position P2 after Environmental Change>

Next, using the flowchart in FIG. 5, an operation procedure when the user sets a robot stop position P2 after the environmental change by utilizing the robot stop position P1 registered in the map M1 in FIG. 4 when the arrangement of the object in the environment is changed within the same site, or when the mobile robot system 1 is relocated to a different site will be described.

First, in step S21, the user creates a map M2 by manually operating the robot 5 using the controller 3. The map M2 is a map that is sequentially created by using the output of the sensor 51 when the robot 5 moves within the site after the environmental change (for example, after relocation of stop reference object Ob). Therefore, the user at least manually operates the robot 5 so that the robot 5 moves around the location where the environmental change occurred.

Next, in step S22, the user stores the created map M2 in the storage unit of the setting device 2.

In step S23, the user operates the setting device 2 to read the map M1 and the map M2.

In step S24, the user operates the setting device 2 to read the robot stop position P1 set in the map M1.

In step S25, the user operates the setting device 2 to select a region R1 including the stop reference object Ob from the map M1. The details of this process will be described in FIG. 7.

In step S26, the setting device 2 automatically calculates the robot stop position P2 in the map M2. The details of a calculation method for the robot stop position P2 will be described below.

Finally, in step S27, the user operates setting device 2 to store the robot stop position P2 in the map M2 in the setting device 2 as a new stop position to replace the robot stop position P1.

Figure 5:
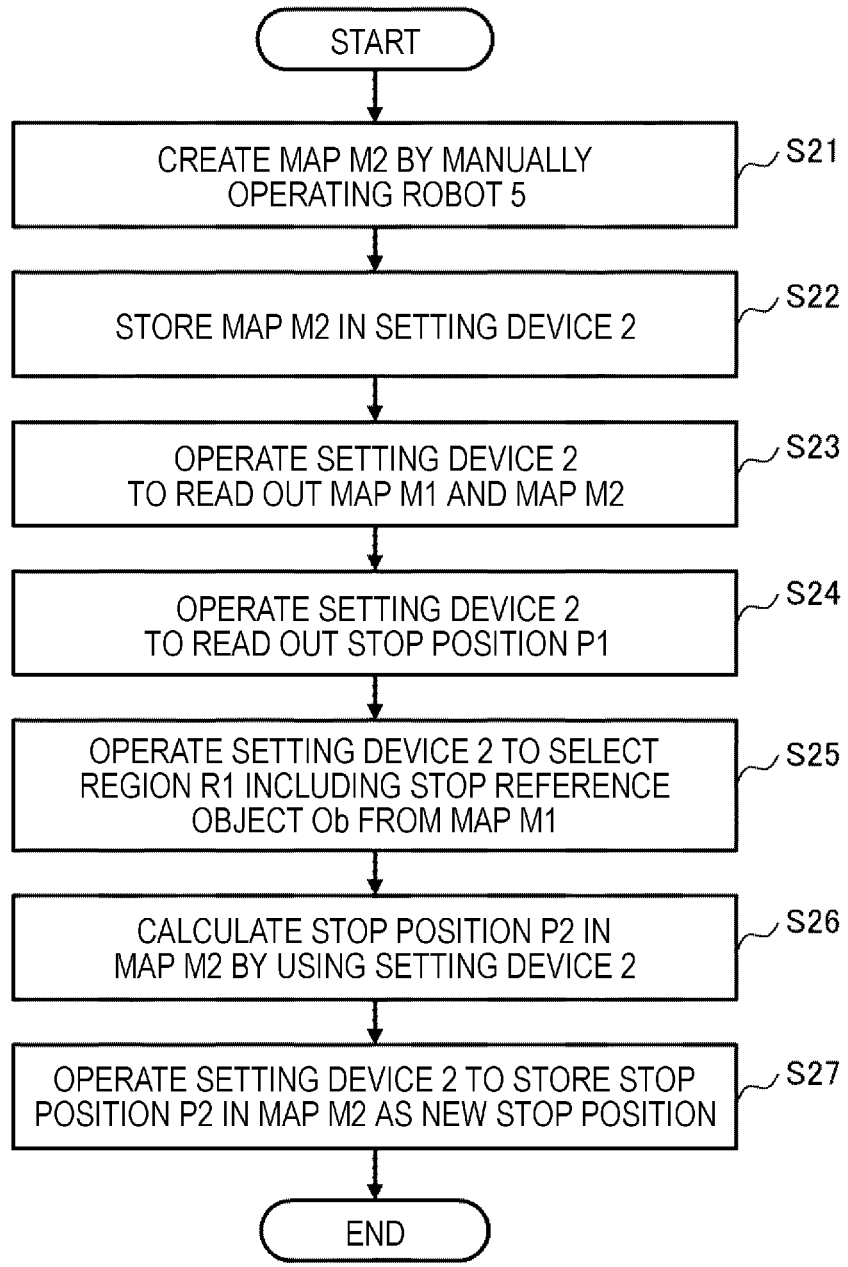
FIG. 5 is a flowchart for setting the robot stop position after the environmental change in the first example.

According to the operation procedure of FIG. 5 described above, since the robot 5 does not need to be operated after step S22 for creating a map, a new robot stop position can be easily set in a short time.

<Specific Setting Method for Robot Stop Position P2 after Environmental Change>

Figure 6:
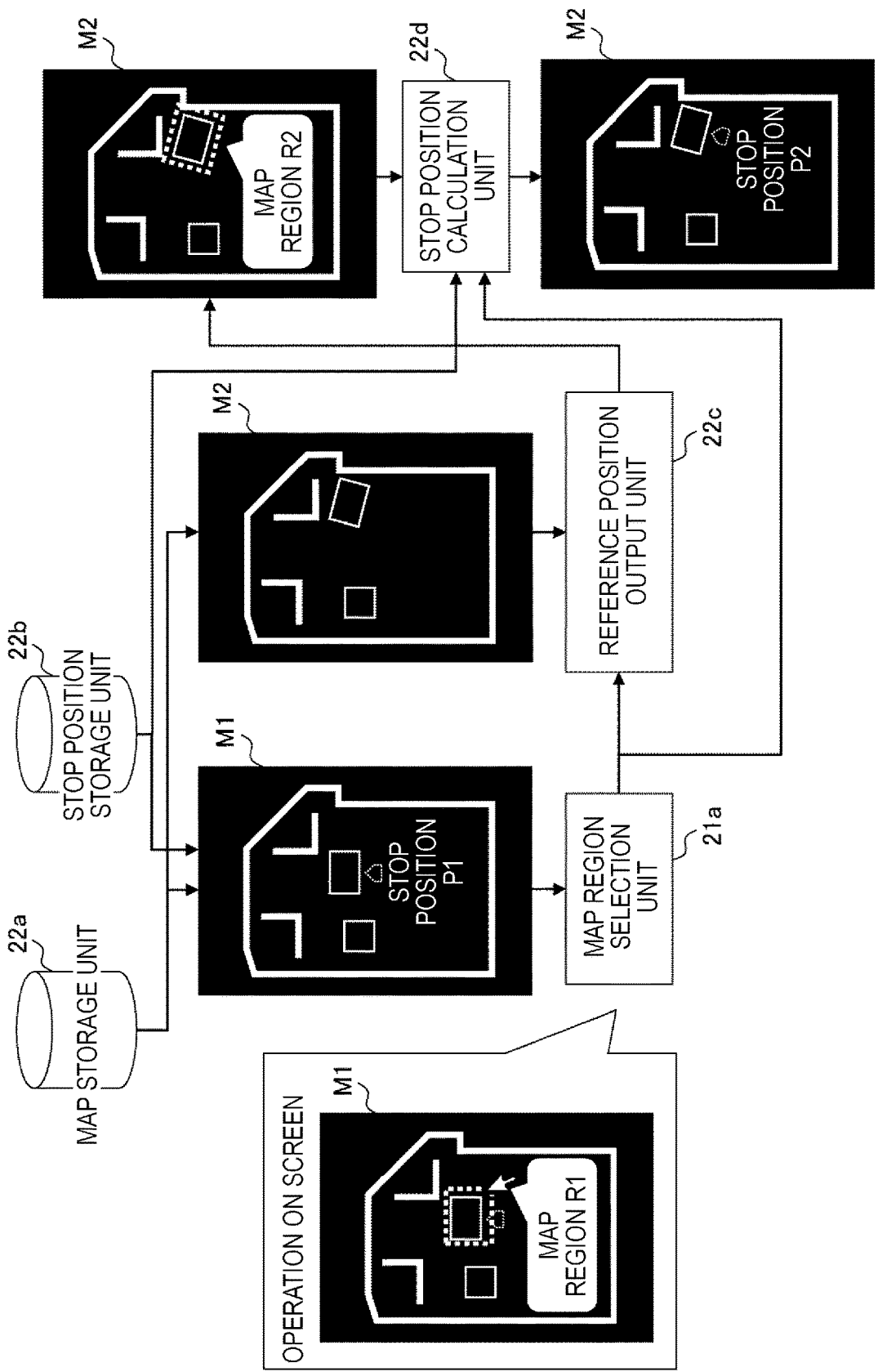
FIG. 6 is a view illustrating an example of a specific setting method for the robot stop position of the first example.

FIG. 6 illustrates an example of a specific setting method for the robot stop position P2 by the setting device 2. FIG. 6 corresponds to the processing from step S23 to step S27 in FIG. 5.

As illustrated here, the setting device 2 of this example includes, as a configuration for setting the robot stop position P, a map region selection unit 21a, a map storage unit 22a, a stop position storage unit 22b, a reference position output unit 22c, and a stop position calculation unit 22d. An actual entity of the map region selection unit 21a is the user interface 21, and an actual entity of the map storage unit 22a, the stop position storage unit 22b, the reference position output unit 22c, and the stop position calculation unit 22d is the arithmetic device 22. The functions of units will be described below in order.

The map storage unit 22a is a functional unit that stores the map information (maps M1 and M2) created in steps S11 and S21, and provides the map information to the map region selection unit 21a and the reference position output unit 22c.

The stop position storage unit 22b is a functional unit that stores the robot stop position P1 on the map M1 registered in step S15, and provides information on the robot stop position P1 to the map region selection unit 21a and the stop position calculation unit 22d.

The map region selection unit 21a is a functional unit that specifies the region R1 including the stop reference object Ob within the detection range selected by the user from the map M1, and outputs it to the reference position output unit 22c and the stop position calculation unit 22d. In addition, the region referred to here is a region defined by, for example, data obtained by cutting out a part of the map data and data that has X and Y coordinates of a start point of the range of the cut-out map data, a width W of the range, a height H of the range, and a rotation angle θ of the range.

The map region selection unit 21a displays the map M1 and the stop position P1 on the screen, and then designates a region including, for example, the stop reference object Ob by dragging the mouse. The method of selecting the region including the stop reference object Ob may be an operation of filling the screen or an operation of clicking part of the region including the stop reference object Ob. When the region R1 is selected by clicking, some kind of image processing such as segmentation is performed on the map information, and objects having connection relationships with the clicked position are automatically extracted.

The reference position output unit 22c is a functional unit that detects a region R2 having the same shape as the region R1 from the map M2 and outputs the position of the region R2 as a reference position to the stop position calculation unit 22d.

The stop position calculation unit 22d is a functional unit that calculates the robot stop position P2 on the map M2 using a positional relationship between the robot stop position P1 and the region R1 on the map M1 and the position of the region R2 on the map M2 so that the positional relationship of the robot stop position P2 with respect to the region R2 of the map M2 is equal to the robot stop position P1 with respect to the region R1 of the map M1.

Figure 7:
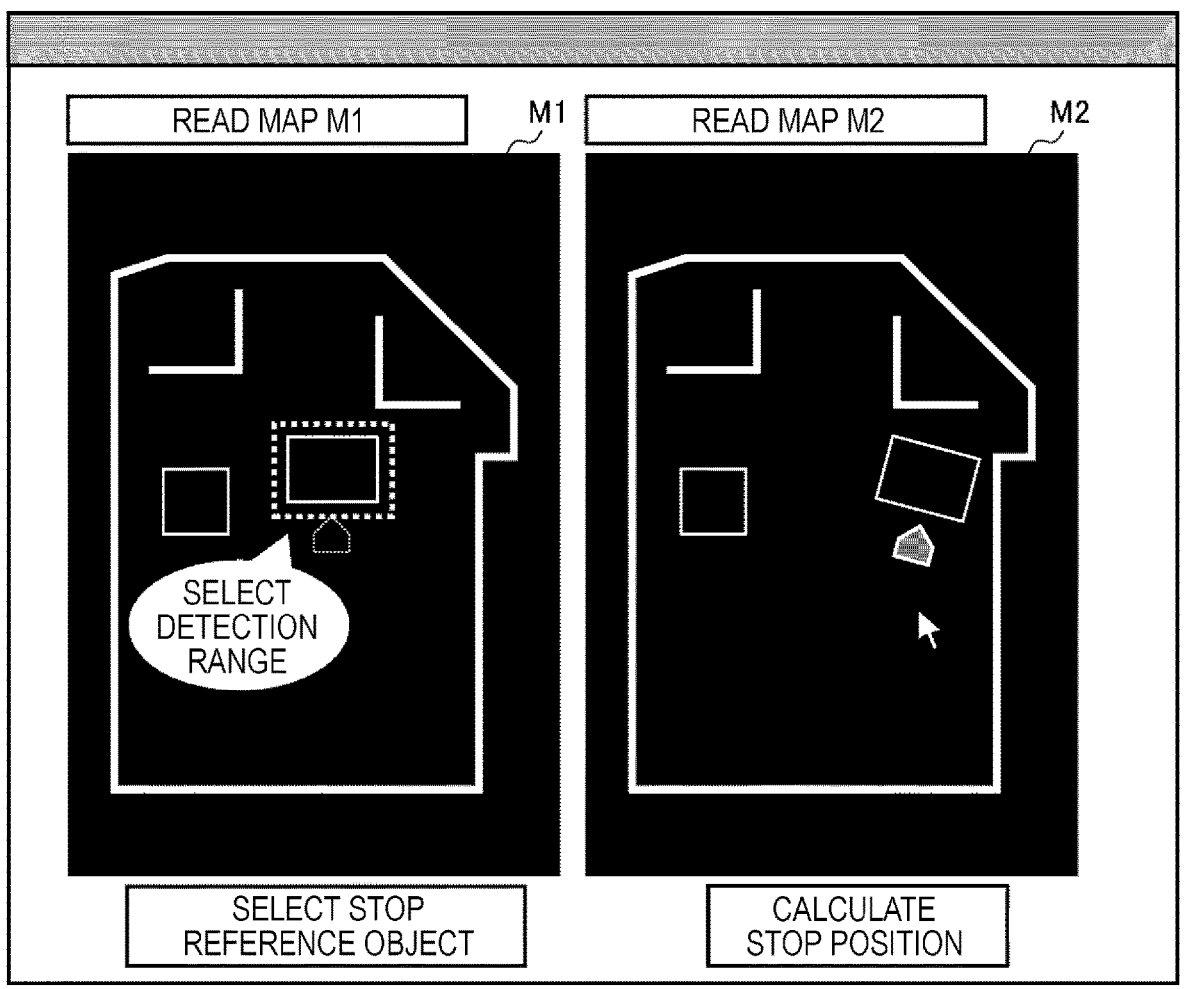
FIG. 7 is an example of an operation screen of a stop position setting device of the first example.

FIG. 7 is an example of an operation screen displayed on a display of the user interface 21 when the user selects the region R1 including the stop reference object Ob from the map M1 in step S25. In this way, by displaying the map M1 and the map M2 side by side on the display at the same time, the user can easily grasp a difference before and after the environmental change, so it is possible to easily specify the stop reference object Ob in each map.

With the robot stop position setting device of this example described above, when the work of setting the robot stop position based on the stop reference object as a reference is performed only once, even when the position of the stop reference object is changed or the mobile robot system is relocated to another site and the environment map is updated, there is no need to operate the actual machine to reset the stop position. As a result, it is possible to reduce the time required to set the robot stop position.

Second Example

Figure 8:
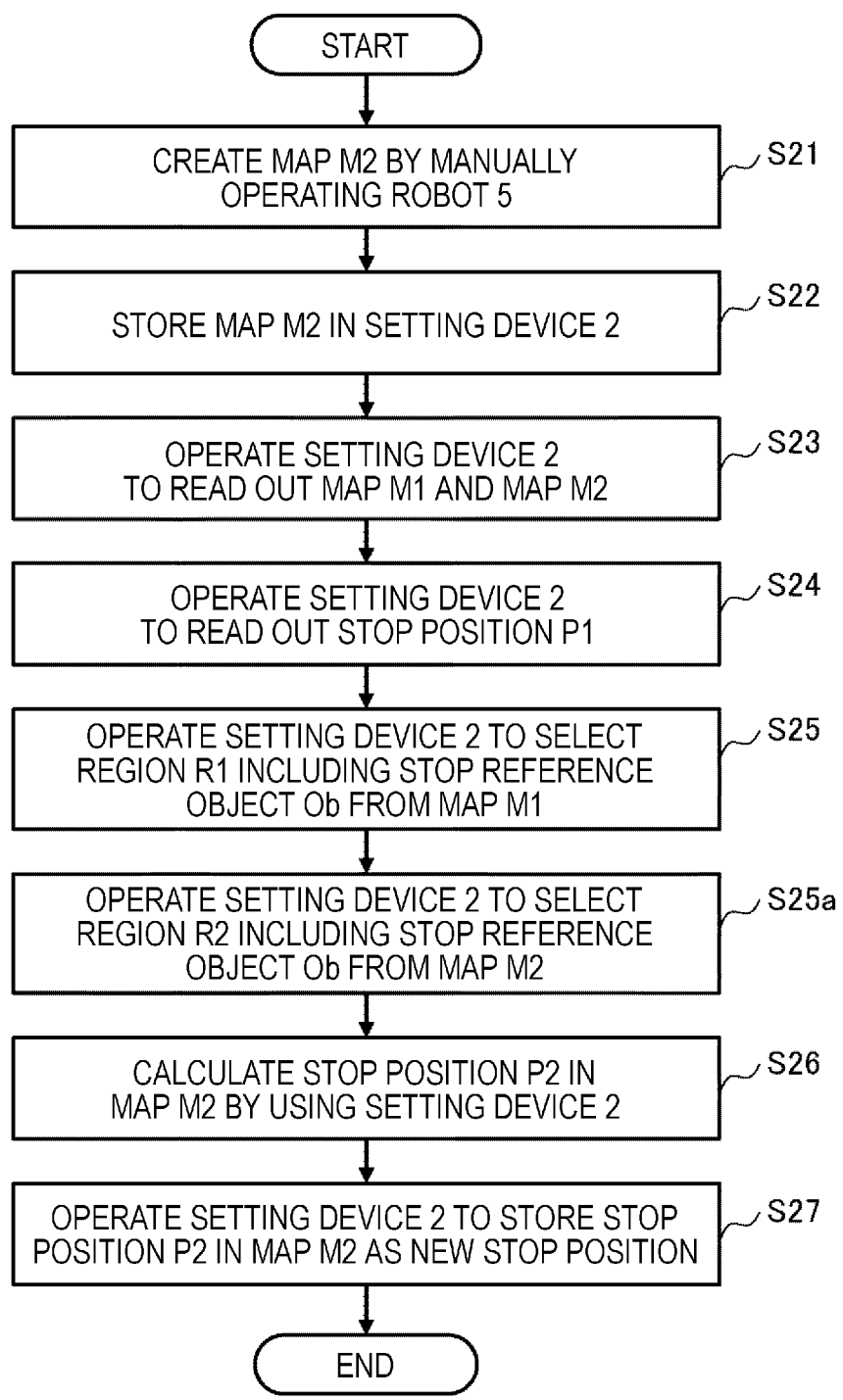
FIG. 8 is a flowchart for setting a robot stop position after environmental change in a second example.

FIG. 8 is a flowchart for setting the robot stop position P2 after environmental change in a second example. In this example, step S25a is added between steps S25 and S26 of the first example. In this step S25a, the user designates the detection range for the stop reference object Ob in the map M2 as in step S25.

Figure 9:
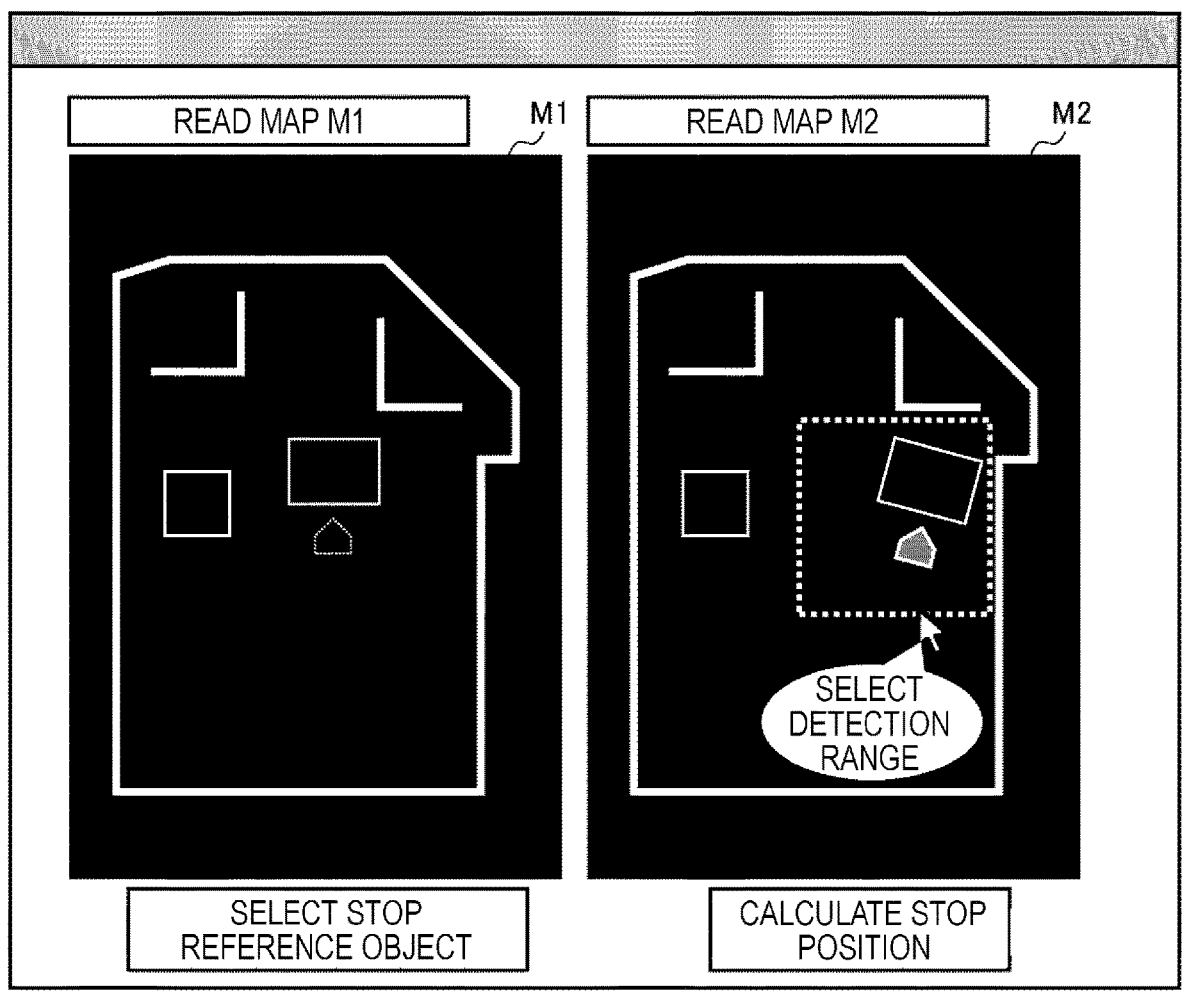
FIG. 9 is an example of an operation screen of a stop position setting device of the second example.

FIG. 9 is an example of an operation screen in step S25a of the second example. The detection range is determined, for example, by dragging the mouse or filling the range. Then, steps S26 and S27 are performed in the same manner as in the first example.

The second example has a detection range selection unit 21b in addition to the configuration of the first example for the processing of step S25a. The actual entity of the detection range selection unit 21b is the user interface 21. The reference position output unit 22c of the second example receives the detection range from the detection range selection unit as an input, and detects the region R2 including the stop reference object Ob from the detection range. In this way, by allowing the user to limit the detection range for the map M2 as well, false detection of the stop reference object Ob in the map M2 can be reduced.

Third Example

Figure 10:
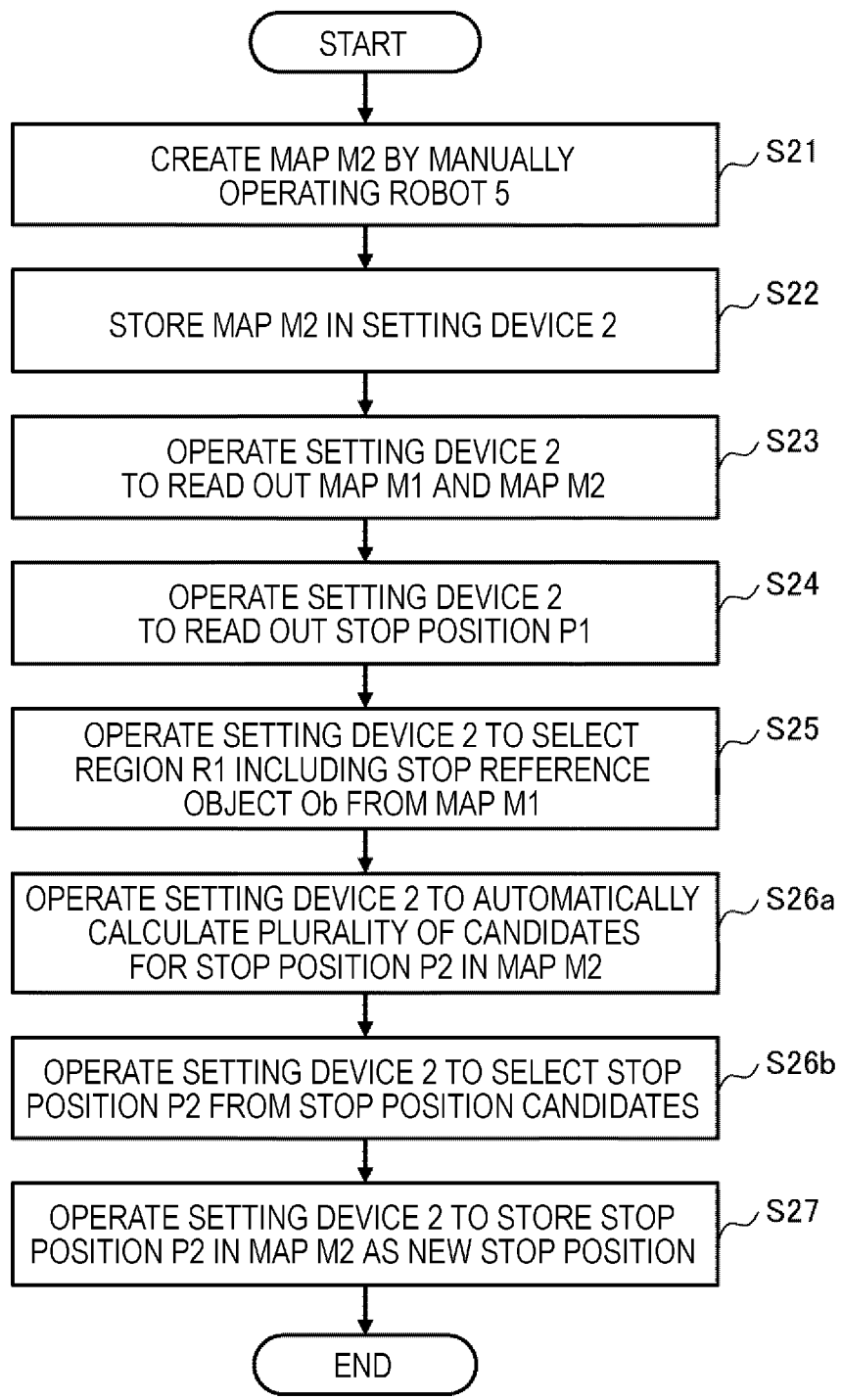
FIG. 10 is a flowchart for setting a robot stop position after environmental change in a third example.

FIG. 10 is a flowchart for setting the robot stop position P2 after environmental change in a third example. In this example, step S26 of the first example is replaced with steps S26a and S26b. In step S26a, a plurality of candidates for the robot stop position P2 of the map M2 are automatically calculated, so in step S26b, the user selects an appropriate robot stop position P2 from among the created candidates.

Figure 11:
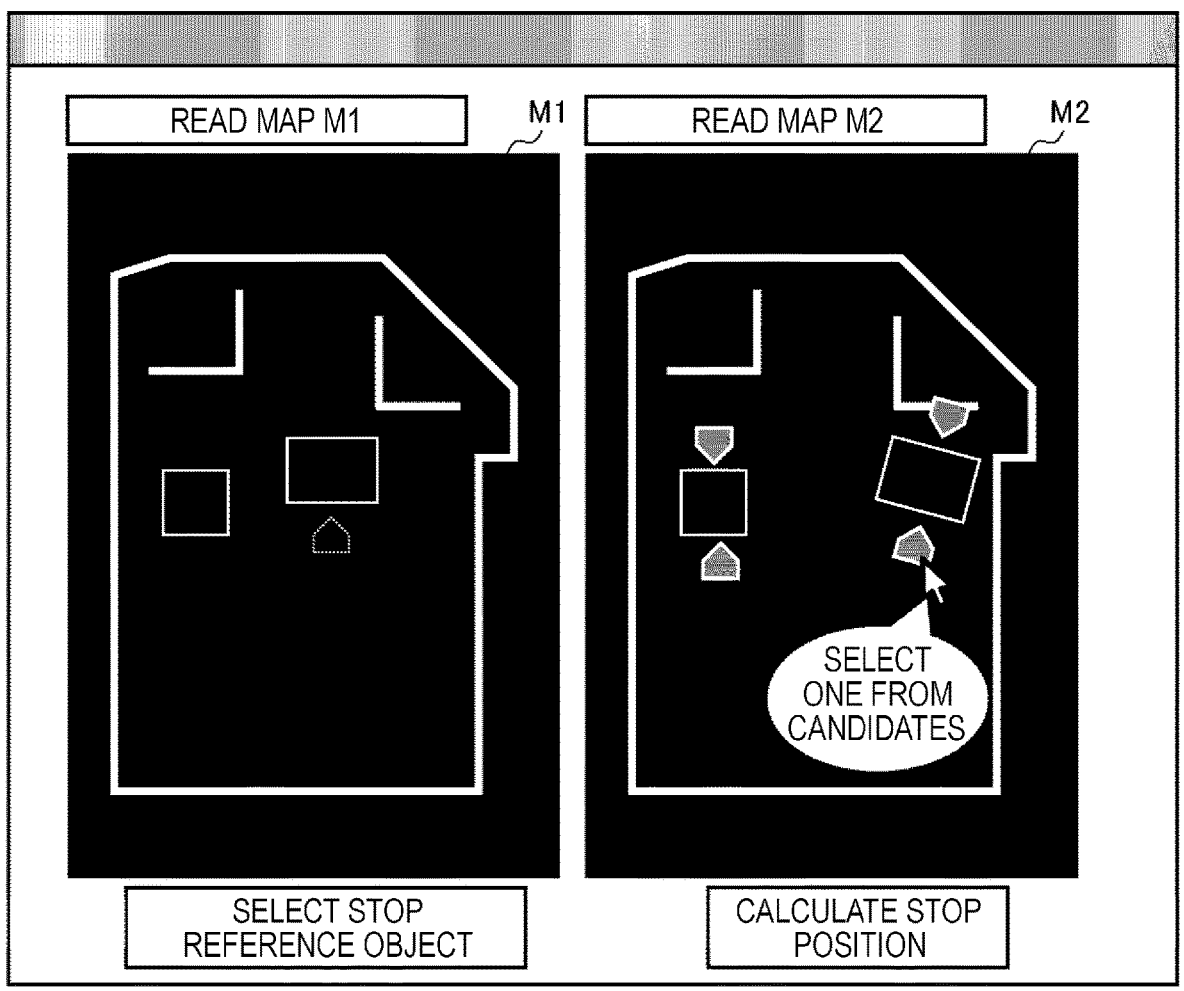
FIG. 11 is an example of an operation screen of a stop position setting device of the third example.

FIG. 11 is an example of an operation screen in step S26b of the third example. In this example, four candidates for the robot stop position P2 are displayed on the map M2, so the user can specify the most appropriate position as the robot stop position P2 from among the candidates. As a result, for example, even when the stop reference object Ob has a point-symmetrical shape and the stop position is not uniquely determined, the user can set a desired stop position.

Therefore, in a stop position setting device of the third example, the reference position output unit 22c is realized by outputting a plurality of reference positions for the detected region R2, the stop position calculation unit 22d is realized by outputting a plurality of candidates for the robot stop position P2 in the map M2 using the plurality of reference positions, a stop position candidate selection unit 21c is realized by receiving a result selected by the user from among the plurality of stop position candidates, and the stop position calculation unit 22d is realized by outputting the user's selection result received by the stop position candidate selection unit 21c as the robot stop position P2 on the map M2.

Fourth Example

Figure 12:
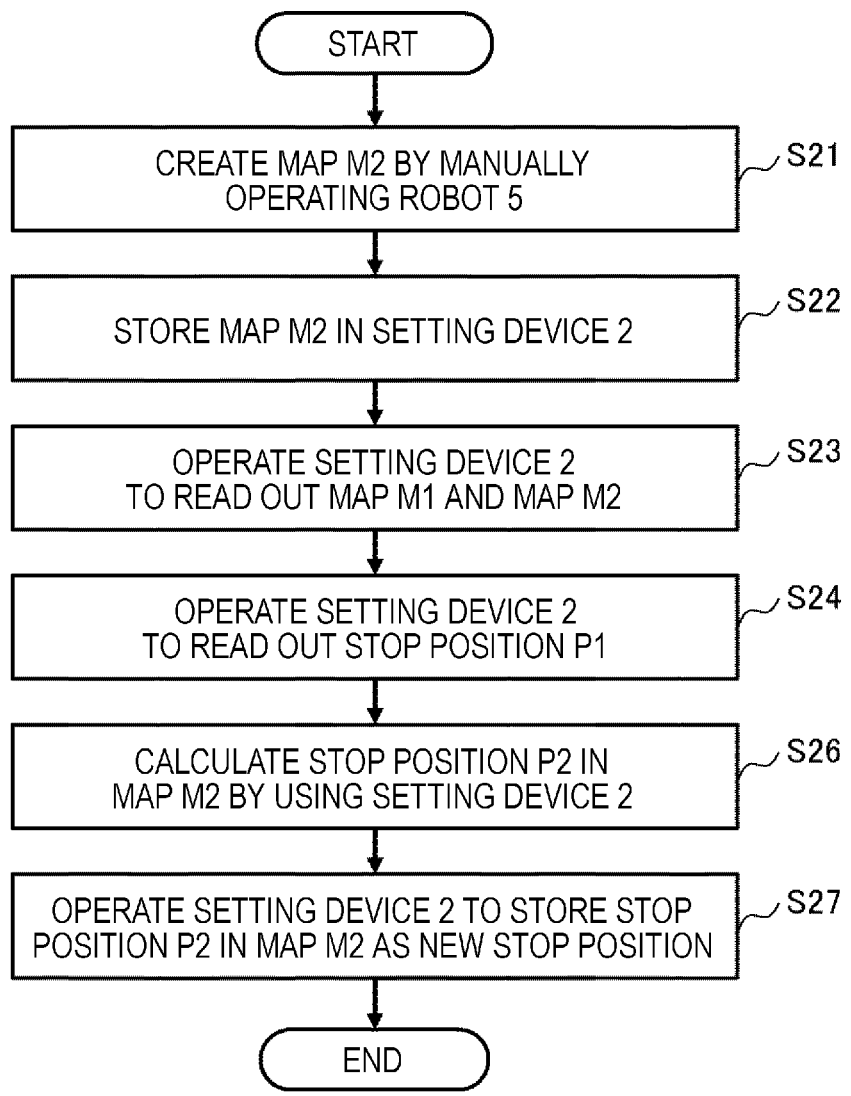
FIG. 12 is a flowchart for setting a robot stop position after environmental change in a fourth example.

FIG. 12 is a flowchart for setting the robot stop position P2 after environmental change in a fourth example. In this example, step S25 of the first example is omitted. That is, the robot stop position P2 is automatically derived in step S26 without intervention of an operation by the user, thereby reducing the number of operations by the user and allowing the stop position to be set in a shorter period of time.

Figure 13:
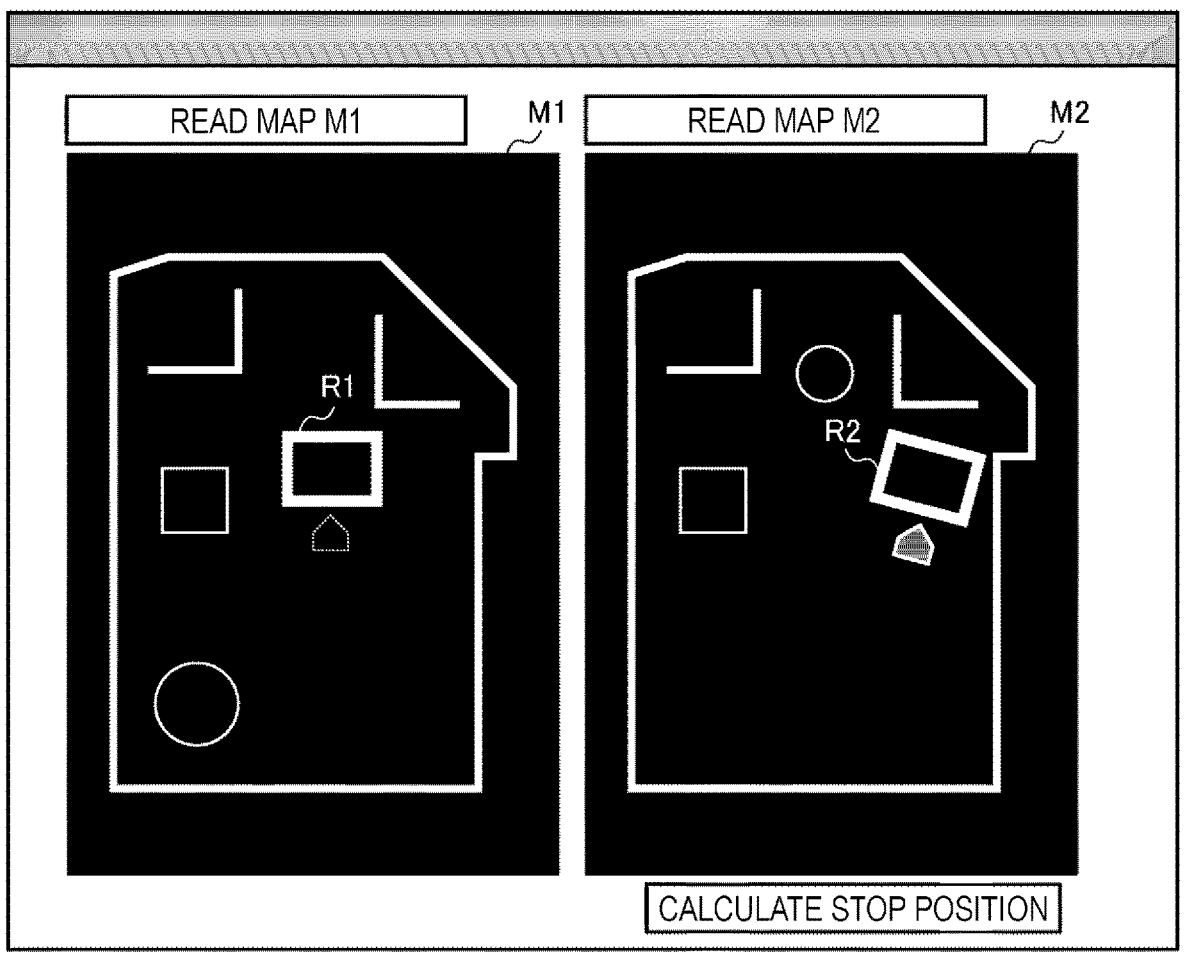
FIG. 13 is an example of an operation screen for a stop position setting device of the fourth example.

FIG. 13 is an example of an operation screen in step S26 of the fourth example. As described above, in this example, the process corresponding to step S25 of the first example is omitted, but an operation screen as illustrated in FIG. 13 is prepared for the purpose of providing information to the user.

In FIG. 13, of the difference between the maps M1 and M2, portions of the same shape are detected as the region R1 and the region R2 and expressed on the map in an emphasizing manner. As for a method of emphasizing expression, for example, image processing of expansion processing is performed on the region. The method of emphasizing expression may be, for example, highlighting with a different color, or drawing a figure such as a bounding box of the region or an arrow indicating the region.

Figure 14:
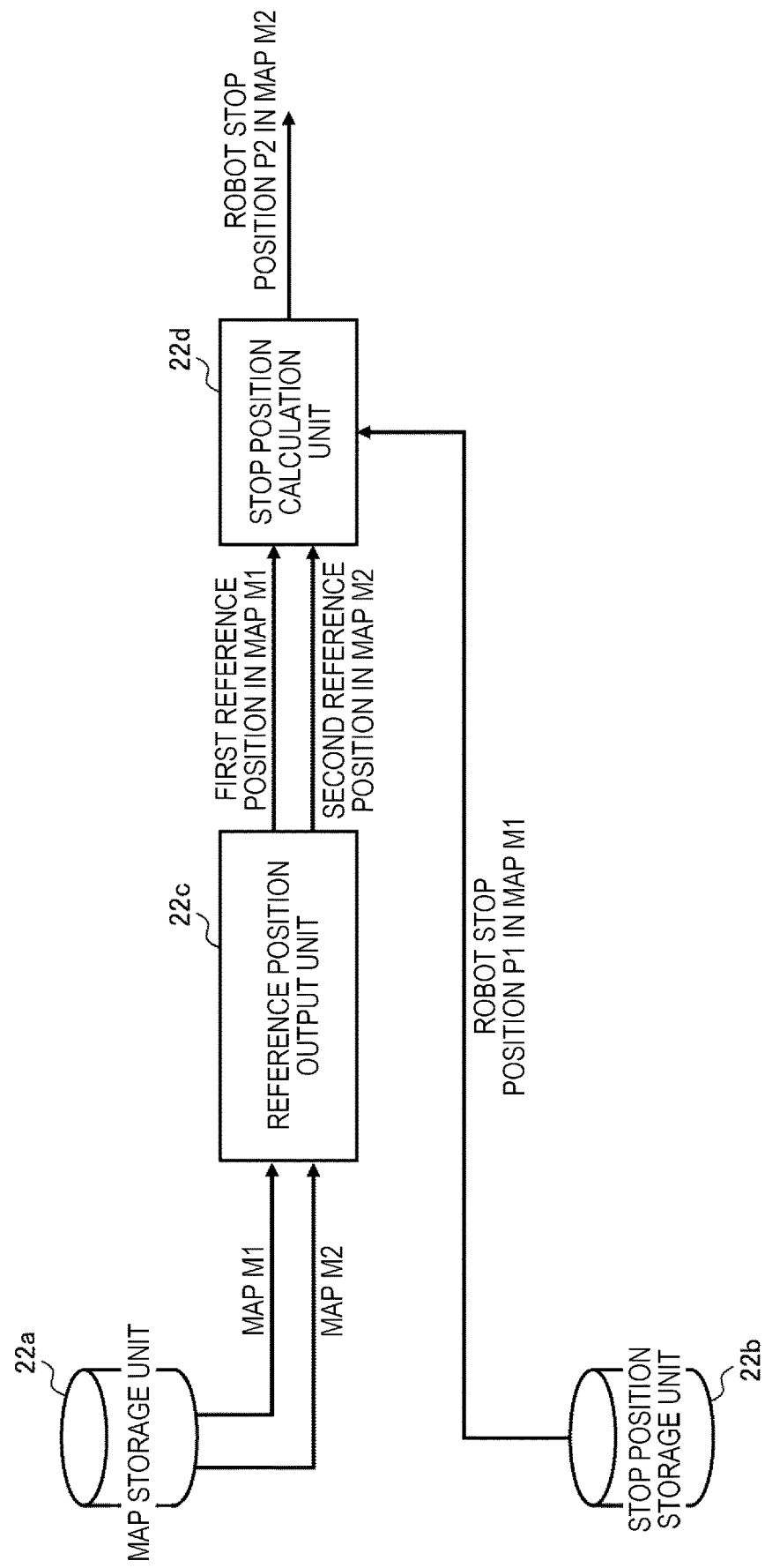
FIG. 14 is a configuration example of the stop position setting device of the fourth example.

FIG. 14 illustrates an example of a method of deriving the stop position in the setting device 2 of the fourth example. A stop position setting device in this fourth example is realized by including a map storage unit 22a for storing map information of the map M1 and the map M2, a stop position storage unit 22b for storing robot stop position P1 on the map M1, a reference position output unit 22c that receives inputs of the map M1 and the map M2, detects the region R1 in the map M1 and the region R2 in the map M2, and outputs the positions of the region R1 and the region R2 as first and second reference positions, respectively, and a stop position calculation unit 22d that calculates the robot stop position P2 on the map M2 using the robot stop position P1, the first reference position, and the second reference position.

Figure 15:
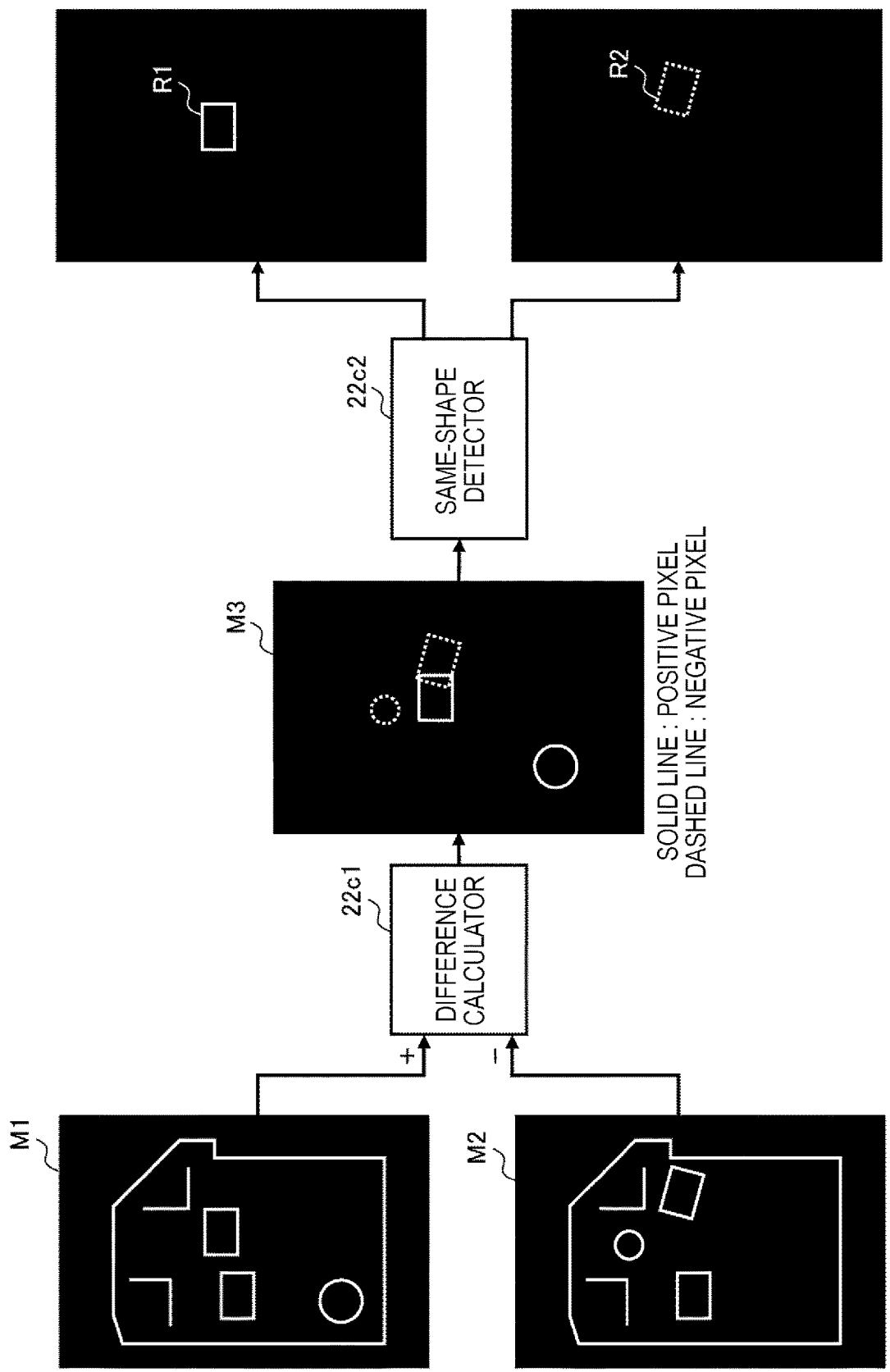
FIG. 15 is a configuration example of a reference position output unit of the fourth example.

FIG. 15 is a diagram illustrating a configuration example of the reference position output unit 22c. As illustrated here, in the reference position output unit 22c, the map M1 and the map M2 are input to a difference calculator 22c1, the difference between matrices representing the maps is calculated, and a difference map M3 is derived. The difference map M3 has positive pixels and negative pixels, so a same-shape detector 22c2 that derives figures having shapes common to a group of positive pixel figures and a group of negative pixel figures by means of suitable segmentation and matching algorithms can be realized. Thus, the region R1 and the region R2 can be derived from the maps M1 and M2.

Therefore, the automatically derived region R1 and region R2 can be used to continue processing similar to that of the first example.

Fifth Example

Figure 16:
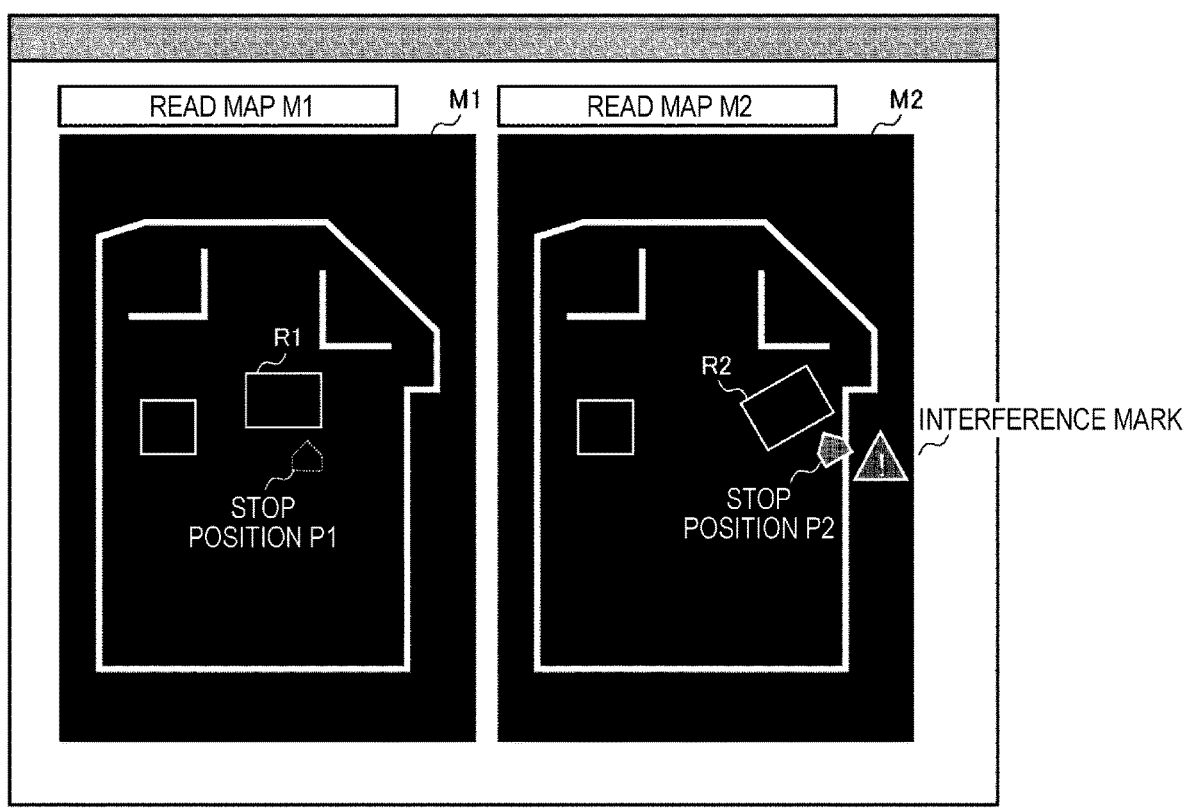
FIG. 16 is an example of an operation screen for a stop position setting device of a fifth example.

FIG. 16 is an example of an operation screen for a stop position setting device of a fifth example. In addition to any one of the first example to the fourth example, the fifth example has a function of confirming whether interference with the surrounding environment occurs when the robot 5 stops at the stop position P2.

In order to realize an interference confirmation function, the fifth example has an interference confirmation unit 22e that receives as inputs the stop position P2 of the robot 5 in the map M2 output by the stop position calculation unit 22d and the map M2, and determines whether interference between the robot 5 and the surrounding environment will occur. When interference is confirmed by the interference confirmation unit 22e, the color of the interference site on the operation screen of a stop position setting device is changed, or a mark indicating interference is displayed (see FIG. 16).

When the stop position is set after the robot 5 is actually moved to the stop position as in the related art, safety is ensured by not interfering with the surrounding environment even when the robot 5 is stopped at that position. However, in the first example to the fourth example, safety could not be ensured. The fifth example solves this problem.

Sixth Example

A sixth example is a further improvement of the stop position setting device of the fifth example, and has a function of proposing a position of the stop reference object Ob where no interference occurs when interference between the robot 5 and the surrounding environment is confirmed.

In order to realize the function described above, in this example, an alternative position proposal unit 22f that presents an alternative relocation position of the stop reference object Ob in the map M2 where no interference occurs when the interference confirmation unit 22e detects interference between the robot 5 and the surrounding environment is provided. This alternative position proposal unit 22f can be realized by generating translation and rotation transformation matrices, repeatedly performing a trial of simultaneously transforming and moving the region R2 and the stop position P2 in the map M2, and terminating the search and outputting the position when the position of the stop reference object Ob where no interference occurs is found. When the transformation matrix is generated in this trial, a position as close as possible to the initial stop position P2 can be proposed by searching while gradually changing a translational displacement and an amount of rotation from small values to large values.

The sixth example has an effect of enabling efficient system startup by presenting specific alternatives to the user when the mobile robot system 1 cannot accomplish the task in its current state.

Seventh Example

In the first example to the sixth example, the stop reference object Ob is detected on the map M2 after the environmental change, and the stop position P2 is derived based on the detection result. However, in general, the grid resolution of the maps M1 and M2 is not necessarily high, so the detection result of the region R2 on the map M2 involves a certain amount of error. A seventh example provides a solution to this problem.

A stop position setting device of the seventh example is a further improvement of the stop position setting device of any one of the first example to the sixth example, and includes a stop reference object recognition unit 22g that recognizes a relative position of the stop reference object Ob from the robot 5 in real space, a stop reference object recognition result storage unit 22h that stores a recognition result of the stop reference object recognition unit 22g, and a stop position correction unit 22i that corrects the stop position of the robot 5 on the map M2. The stop position correction unit 22i corrects the stop position P2 of the robot 5 on the map M2 based on a first recognition result in which the stop reference object recognition unit 22g recognizes a relative position of the stop reference object Ob from the stop position P1 of the robot 5 in the map M1 in the real space corresponding to the map M1, and a second recognition result in which the stop reference object recognition unit 22g recognizes a relative position of the stop reference object Ob from the stop position P2 of the robot 5 in the map M2 in the real space corresponding to the map M2.

The correction amount of the stop position P2 can be calculated as follows. Assume that the first recognition result and the second recognition result are represented by 4×4 three-dimensional transformation matrices T1 and T2, and a coordinate transformation from a robot's base link to the camera is Tc. When the coordinate conversion from the stop position P2 before correction to a stop position P2' after correction is T, the coordinate transformation from the stop position P2 to Ob is expressed as $Tc \times T2$ or $T \times Tc \times T1$, so the following equation holds. $T \times Tc \times T1 = Tc \times T2$. Therefore, the three-dimensional transformation matrix T for correcting the stop position P2 is calculated by the following equation. $T = Tc \times T2 \times T1^{-1} \times Tc^{-1}$. $T1^{-1}$ and $Tc^{-1}$ indicate inverse matrices of T1 and Tc in order.

Eighth Example

An eighth example is a further improvement of the stop position setting device of any of the first example to the seventh example, and includes a route calculation unit 22j that receives the map M2, the stop position P2, and a movement start position of the robot 5 on the map M2 as inputs and derives a route for the robot 5 to move from the movement start position of the robot 5 on the map M2 to the stop position.

The route calculation unit 22j uses a search method such as the Dijkstra method to derive a route L that does not interfere with obstacles on the map M2.

According to the eighth example, the user can derive the route of the robot 5 without manually editing the route, and can easily set the operation of the robot 5 in a short time.

Ninth Example

A ninth example is a further improvement of the mobile robot system 1 of any one of the first example to eighth example. By calculating a difference between a measurement result I5 of the surrounding environment by the sensor 51 of the robot 5 and the map M1 and determining that there has been a large environmental change when the calculated difference is equal to or greater than a preset threshold value, the user is requested to create the map M2 and output the stop position P2 of the robot 5 on the map M2.

As a method of calculating the difference, for example, it is possible to create a difference map M4 within a range measurable by the sensor 51, calculate the difference between each grid observed in the difference map M4 and the grid in the map M1, and sum them. Alternatively, when the sensor 51 is a sensor that emits a plurality of laser beams, the difference can be the number of obstacles that do not have corresponding obstacles in the map M1 of the obstacles detected by the laser beams.

In the mobile robot system 1 of the ninth example, there is a large deviation between the map M1 set by the user and the real space, which has the effect of preventing the robot from malfunctioning during traveling.

Tenth Example

In the first example to the ninth example, the reference position output unit 22c detects from the map M2 with the same shape as the region R1 of the map M1. However, since the maps M1 and M2 are maps obtained by observing the surrounding environment with the sensor 51 while the robot 5 is traveling, when part of the stop reference object Ob is hidden behind a covering object, there is an occlusion problem that the stop reference object Ob in the map M1 and the stop reference object Ob in the map M2 appear to have partially different shapes. In this case, when a shape partially different from the region R1 exists in the map M2, it is necessary to determine whether it is a stop reference object Ob that looks different due to occlusion, or an object with a different shape from the stop reference object Ob. A tenth example provides a solution to such problems.

In the tenth example, each grid of the maps M1 and M2 stored in the map storage unit 22a is provided with not only the probability of existence of an obstacle but also information as to whether the presence or absence of an obstacle has been confirmed. For example, grids that have been confirmed for obstacles are labeled "KNOWN", and grids that have not yet been confirmed are labeled "UNKNOWN". This label can be given based on the measurement result of the sensor 51 when creating a map. Specifically, there is a method that all grids are set to "UNKNOWN" at the beginning of map creation, and then when an obstacle is detected at a certain position, the grid where the obstacle exists and the grid located between the robot and the obstacle are updated to "KNOWN".

In the tenth example, the reference position output unit 22c utilizes template matching as a method of detecting the region R1 from the map M2, but the method of calculating the degree of matching between the region R1 and the map M2 is improved. First, images R1' and M2' with the same resolution as the number of grids of the region R1 and the map M2 are created. Then, pixel values of the images R1' and M2' corresponding to the grids with "UNKNOWN" are set to 0 (zero). Next, regarding grids of the region R1 and the map M2, grids with probability of existence of obstacles equal to or greater than a threshold value are regarded as having obstacles, and pixel values of corresponding images R1' and M2' are set to positive values. Further, regarding grids of the region R1 and the map M2, grids with probability of existence of obstacles below the threshold value are regarded as having no obstacle, and pixel values of corresponding images R1' and M2' are set to negative values. M2'(i,j) is set as the pixel value at the coordinates (i,j) of the image M2', and a function R1'(k,l) is set as the pixel value at the coordinates (k,l) on the image R1'. Then, the matching degree P(i,j) at the position (i,j) on M2' is calculated by, for example, the following equation.

[Equation 1]

$$P(i,j)=\Sigma_{k,l}W(i,j,k,l)R_2'(k,l)M_2'(i+k,j+l) \qquad \text{(Equation 1)}$$

W(i,j,k,l) is a function that calculates a weight based on pixel values of R1' and M2', and a value of W(i,j,k,l) is equal to or greater than zero.

In this way, by setting different pixel values for a region that is not observed due to occlusion and a region that is confirmed to be free of obstacles based on an observation result, and calculating the degree of matching, the degree of matching does not decrease in the region where the shape appears different due to occlusion, but decreases in the region where an object with a shape different from that of the stop reference object Ob is observed. As a result, the robustness of template matching against occlusion is improved.

What is claimed is:

1. A robot stop position setting device that sets a stop position of a robot, comprising:
    a map storage memory for storing map information;
    a stop position storage memory for storing a robot stop position;
    a reference position outputter that outputs a reference position for calculating the robot stop position; and
    a stop position calculator that calculates the robot stop position based on the reference position,
    a map region selector, wherein
    the map storage memory stores a first map and a second map,
    the stop position storage memory stores a robot stop position on the first map,
    the map region selector outputs a first region including a stop reference object selected by a user from the first map,
    the reference position outputter detects a second region having the same shape as the first region from the second map and outputs a position of the second region as a reference position, and
    the stop position calculator calculates the robot stop position on the second map using the robot stop position on the first map, a position of the first region, and the reference position on the second map.

2. The robot stop position setting device according to claim 1, wherein
    the reference position outputter detects the second region from a detection range designated by the user on the second map.

3. The robot stop position setting device according to claim 1, further comprising:
    a stop position candidate selector wherein
    the reference position outputter detects a plurality of the second regions and outputs a plurality of the reference positions, the stop position calculator uses the plurality of reference positions to output a plurality of candidates for the robot stop position on the second map, the stop position candidate selector receives a result selected by the user from the plurality of candidates, and the stop position calculator outputs the result received by the stop position candidate selection unit as the robot stop position on the second map.

4. A robot stop position setting device that sets a stop position of a robot, comprising:

a map storage memory for storing map information;

a stop position storage memory for storing a robot stop position;

a reference position outputter that outputs a reference position for calculating the robot stop position; and a stop position calculator that calculates the robot stop position based on the reference position, wherein the map storage memory stores a first map and a second map, the stop position storage memory stores a robot stop position on the first map, the reference position outputter outputs a position of a stop reference object detected from the first map as a first reference position, and outputs a position of a stop reference object detected from the second map as a second reference position, and the stop position calculator calculates the robot stop position on the second map using the robot stop position on the first map, the first reference position, and the second reference position on the second map.

5. The robot stop position setting device according to claim 1, further comprising:

an interference confirmator, wherein the interference confirmator determines whether interference between a robot and surrounding environment occurs based on the robot stop position on the second map output by the stop position calculation unit and the second map.

6. The robot stop position setting device according to claim 5, further comprising:

an alternative position proposer wherein when the interference confirmator detects interference between the robot and the surrounding environment, the alternative position proposer presents an alternative relocation position of the stop reference object on the second map.

7. The robot stop position setting device according to claim 1, further comprising:

a stop reference object recognizer a stop reference object recognition result memory, and a stop position corrector, wherein the stop reference object recognizer recognizes a relative position of the stop reference object from the robot in real space, the stop reference object recognition result memory stores a recognition result of the stop reference object recognizer, and the stop position corrector corrects the robot stop position on the second map based on a result of recognition of a relative position of the stop reference object by the stop reference object recognizer from the robot stop position on the first map in a first real space corresponding to the first map, a result of recognition of a relative position of the stop reference object by the stop reference object recognizer from the robot stop position on the second map in a second real space corresponding to the second map, and a stop position of the robot on the second map.

8. The robot stop position setting device according to claim 1, further comprising:

a route calculator wherein the route calculator receives the second map, the robot stop position on the second map, and a movement start position of the robot on the second map as inputs and derives a route along which the robot moves from the movement start position of the robot on the second map to the robot stop position.

9. A mobile robot system comprising the robot stop position setting device according to claim 1, and a robot with a sensor that measures surrounding environment in real space, wherein the robot stop position setting device calculates a difference between a measurement result of the surrounding environment by the sensor and the first map, and requests a user to create the second map and output the robot stop position on the second map when the difference is equal to or greater than a preset threshold value.

10. The robot stop position setting device according to claim 1, wherein the first map and the second map are grid maps represented by two-dimensional matrix data, and an obstacle existence probability is set in each grid of the first map and the second map.

11. The robot stop position setting device according to claim 1, wherein the first map and the second map are grid maps represented by two-dimensional matrix data, and each grid of the first map and the second map is provided with information as to whether presence or absence of an obstacle is confirmed.

* * * * *